Oct. 24, 1939.   J. C. PARKINSON   2,177,002
APPARATUS FOR THE DETERMINATION OF DEW POINTS
Filed Dec. 2, 1936
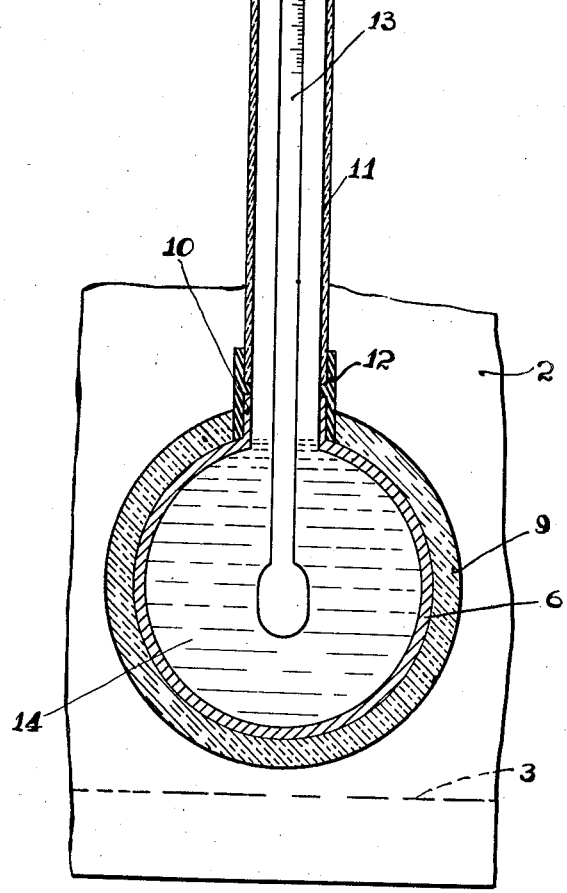
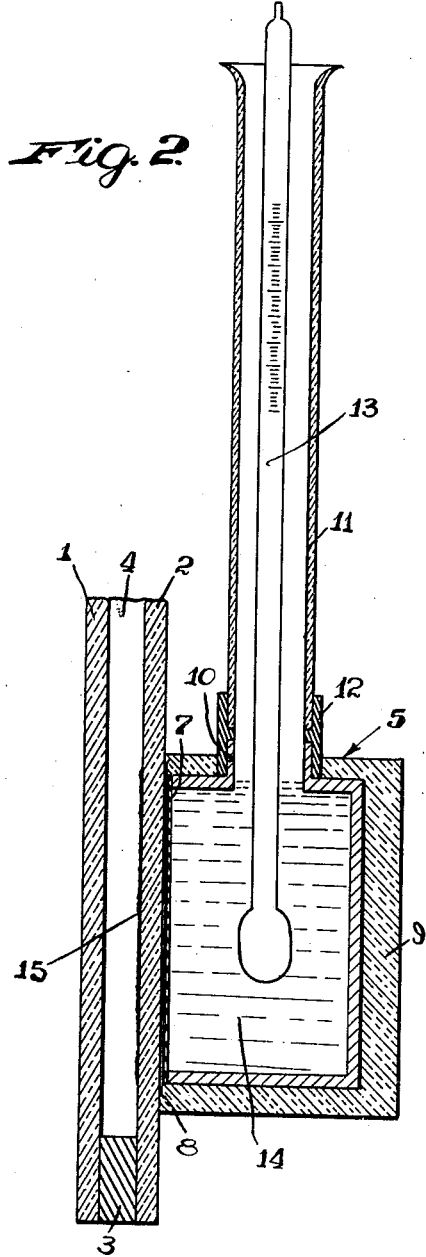
INVENTOR
JOSEPH C. PARKINSON.
BY Bradley & Bee
ATTORNEYS.

Patented Oct. 24, 1939

2,177,002

UNITED STATES PATENT OFFICE 2,177,002

APPARATUS FOR THE DETERMINATION OF DEW POINTS

Joseph C. Parkinson, Tarentum, Pa., assignor to Pittsburgh Plate Glass Company, Allegheny County, Pa., a corporation of Pennsylvania Application December 2, 1936, Serial No. 113,846

4 Claims. (Cl. 73—51)

This invention relates to means for determining the dew point of humid gases. More particularly, it relates to an instrument for determining the moisture content or the dew point of a gas confined in a closed chamber. The primary object of the present invention is to provide apparatus for determining the degree of dehydration of the gas confined in such closed chambers as those formed by the spaced glass sheets of double glazed window units without breaking the seal between the sheets. A second object of the invention is to provide an apparatus which will be effective when very low percentages of water vapor are present in the entrapped gas.

These and other objects and advantages of my invention will be apparent from the following detailed description.

Double glazed units which are frequently employed as means for simultaneously admitting light to and thermally insulating buildings, railway cars, and other closed structures, comprise spaced parallel sheets of glass between the edges of which is a sealing medium, for example, an artificial resin, gum or rubber. A chamber constituting a "dead-air space" of low thermal conductivity is thus formed between the glass sheets. It is important during the fabrication and use of these units to exclude the entrance of any substantial amounts of moisture into the air spaces provided therein, because upon chilling the units below the dew point of the entrapped gas, the moisture will condense upon and cloud the inner surfaces of the glass. It is obvious that during the manufacturing processes or during use, there are often opportunities for moisture to enter the units, which cannot be prevented even by the most carefully controlled operations. Accordingly, it is essential that some means be provided for testing the efficiency of the finished units under conditions which are more severe than any to which a unit will be subjected in service. It is impractical to expose entire units, some of which are extremely large, to a low temperature to determine the dew point of gases therein, and even if this were possible, the results would be inaccurate because a small amount of condensate, invisible during such test, would still be objectionable in a commercial installation.

Heretofore there has not been available to the manufacturers a simple apparatus which would measure accurately the percentage of water vapor existing in the gas contained in a double glazed unit. In most cases anhydrous gas has been introduced into the unit before it was sealed or a dehydrating agent was placed in the air space to completely remove any moisture which might be present. The completed units were immediately shipped without a factory test and those which were imperfect were not discovered until they had failed on exposure to actual operating conditions. This necessitated replacement of the faulty units, but even then there was no assurance on the part of the buyer that the new units would be more satisfactory than those replaced.

According to the present invention, the foregoing difficulties are obviated by cooling a small portion of the wall of a double glazed unit, or similar article, from the exterior thereof, to a suitable temperature and then observing the presence or absence of condensed moisture upon the inner surface of the cooled portion. If moisture condenses at or below a predetermined temperature, the unit is considered imperfect and rejected. If no moisture condenses under the conditions of the test, the unit is considered satisfactory.

An apparatus satisfactory for the above described purpose comprises a suitable container which is filled with a freezing mixture and placed in contact with one glass plate of a double glazed unit. A thermometer or other temperature indicating means is inserted in the freezing mixture and the temperature at which a layer of water vapor condenses upon the inner surface of the glass plate adjacent the apparatus is the dew point of the entrapped gas. This temperature reading may be converted, by means of prepared tables, into percentage readings which will indicate the degree of dehydration of the gas contained in double glazed units.

In the accompanying drawing wherein like numerals are employed to designate like parts throughout the same:

Figure 1 is a sectional view taken upon a plane parallel to the face of a unit to which the instrument embodied by the invention is applied, and Figure 2 is a sectional view taken upon a vertical plane substantially at right angles to the plane of Figure 1.

Referring now to the drawing, a double glazed unit consisting of glass plates 1 and 2, held in spaced relation by a strip of resilient sealing material 3 to provide an air space 4, is supported in a vertical position by suitable means (not shown). The dew point detector, designated in its entirety by the numeral 5, is supported upon the exterior of the plate 2 in any convenient manner. The apparatus comprises a thick walled cylinder 6 of brass, glass or other suitable material, faced with a thin, machined and polished brass disc 7. The disc 7 by reason of its flexibility will intimately contact the glass plate 2 even when there is a slight curvature in said plate. For the purpose of preventing frosting of the exterior of the glass, it is desirable to interpose a thin film 8 of acetone, alcohol or other suitable fluid beneath the disc 7. A layer 9 of cork, fibre or other suitable insulating material surrounds the entire cylinder 6 with the exception of the disc 7.

The upper section of the cylinder 6 is provided with a neck 10 and a glass tube 11 is secured thereto by means of a rubber sleeve 12. A thermometer 13, which may be supported by suitable means (not shown) or allowed to rest upon the bottom of the container, is positioned in the cylinder 6, and extends through the tube 11. The cylinder 6 is filled through the tube 11 with a freezing mixture 14 of acetone and solid carbon dioxide.

The operation of the apparatus to make a dew point determination is substantially as follows:

The double glazed unit is supported in vertical position and while in this position the glass plate 2 is washed with acetone or alcohol and the thin film 8 thereof is left upon the glass. The container 6 filled through the tube 11 with sufficient acetone and solid carbon dioxide to cool a portion of the plate 2 to a suitable temperature, for example, approximately −30 degrees C., is then positioned upon the glass plate 2 with the thin disc 7 separated therefrom only by the film 8 of acetone or alcohol. After a suitable time, for example, approximately two minutes, the apparatus 5 is removed, the plate 2 is washed with acetone and inspected for the presence of a film 15 of condensed water vapor upon its inner surface. In the event that no frost has collected at this temperature, a second quantity of solid carbon dioxide is added to the container 6 through the tube 11 to lower the temperature of the freezing mixture a definite amount, as for example to approximately −35 degrees C., when the apparatus 5 is again positioned upon the glass plate 2. After a predetermined time interval, the apparatus 5 is removed, the plate 2 is washed with acetone and inspected. This process is repeated with continually lowered temperatures until the layer 15 of frost is formed or until a satisfactory temperature limit (e. g. −50 degrees C.) is attained without frosting. The temperature may also be reduced to any desired lower limit at a single stage, thus obviating repeated removals and replacements of the apparatus.

The apparatus shown and described is simple and inexpensive in its construction and operation. It is small and may be transported readily. No special construction or modification of the double glazed units is required and determinations are made wholly from the exterior of the units without impairment of the seal between the glass plates. By concentrating the lowered temperature to one small section of a unit, it is possible to detect the presence of very small quantities of water vapor in the entrapped gases. This is an exceedingly important feature of my invention and permits a more careful check upon the quality of the double glazed units to be made. For these reasons the device is ideally suited for determining the moisture content of the gases contained in double glazed units, either in the factory or in the field during installation or servicing thereof.

It is to be understood that the form of the invention herewith shown and described is to be taken as the preferred embodiment thereof, and that various modifications may be made without departing from the spirit of the invention or the scope of the appended claims.

What I claim is:

1. In combination in apparatus for determining the dew point of a fixed volume of gas contained in a double glazed window construction, a vessel provided with a thin metal face, which is designed to fit in intimate contact with one plate of said window construction, a freezing mixture held in said vessel and indicating means for registering the temperature of the freezing mixture.

2. In combination in apparatus for determining the dew point of a fixed volume of gas contained in a double glazed window construction, a vessel provided with a thin metal face, which is designed to fit in intimate contact with one plate of said window construction, a layer of insulating material substantially surrounding said vessel, a freezing mixture held in said vessel and indicating means for registering the temperature of the freezing mixture.

3. In combination in apparatus for determining the dew point of a fixed volume of gas contained in a double glazed window construction, a vessel provided with a thin metal face, which is designed to fit in intimate contact with one plate of said window construction, having a surface area materially less than that of the glass plate, a layer of insulating material substantially surrounding said vessel, an inlet tube connecting the central portion of said vessel with the atmosphere, a freezing mixture, the temperature of which may be varied, contained in the vessel and indicating means for registering the temperature of the freezing mixture.

4. In combination in apparatus for determining the dew point of a fixed volume of gas contained in a double glazed window construction, a vessel provided with a thin metal face, which is designed to fit in intimate contact with one plate of said window construction, having a surface area materially less than that of the glass plate, a layer of insulating material substantially surrounding said vessel, a projecting tube leading into the central portion of said vessel, a freezing mixture of acetone and solid carbon dioxide contained in the vessel and indicating means for registering the temperature of the acetone-solid carbon dioxide mixture.

JOSEPH C. PARKINSON.